Feb. 23, 1954 W. H. CHERRY 2,669,900
OPTICAL PROJECTION AND REGISTRATION SYSTEM
Filed Feb. 1, 1949
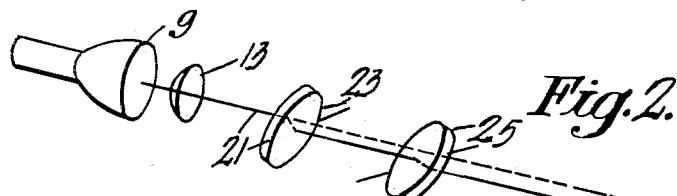
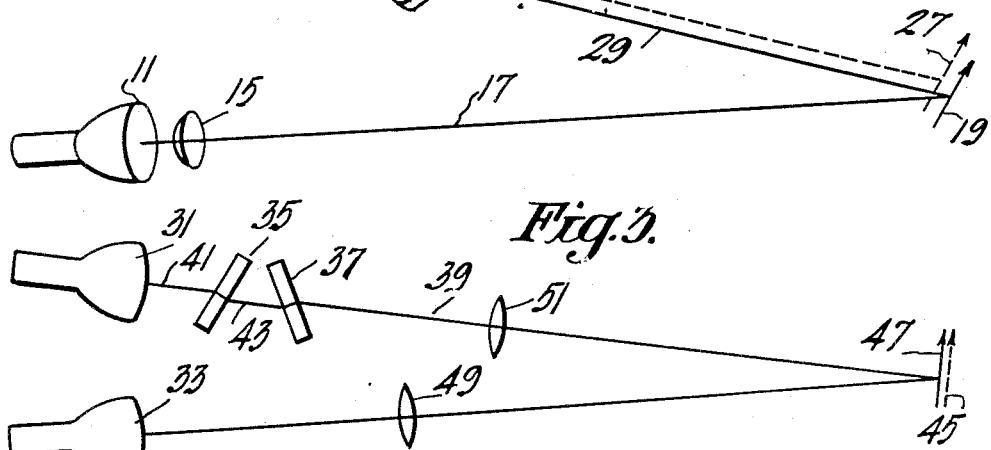
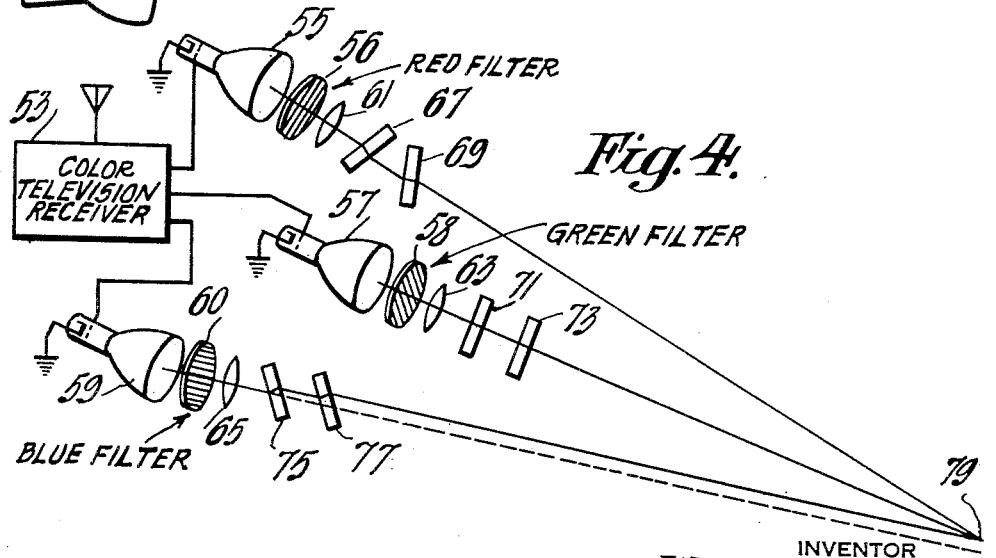
INVENTOR
William H. Cherry
BY
ATTORNEY Patented Feb. 23, 1954

2,669,900

UNITED STATES PATENT OFFICE 2,669,900

OPTICAL PROJECTION AND REGISTRATION SYSTEM

William H. Cherry, Princeton, N. J., assignor to Radio Corporation of America, a corporation of Delaware Application February 1, 1949, Serial No. 73,877

8 Claims. (Cl. 88—24)

This invention relates to optical systems and more particularly to arrangements for controlling optical registration of a plurality of images.

When it is desired to optically register differently positioned points of light or different images such as selected component color images, it is often necessary to carefully adjust the relative positions of the projected images and to independently control the sizes of the individual projected images.

This, of course, can be accomplished by changing the position of the image or point of light source. Such changes may not only be difficult and complex but may tend toward interference with detail and other undesirable effects. It is therefore desirable that the light source remain substantially fixed and that an optical arrangement be provided in each of the light paths to independently control the position and the size of the projected images. Although changing the position of the cooperating lens system will to some extent permit adjustment, there are often additional adjustments necessary which cannot be made by an adjustment of the lens system.

Many ingenious devices have been suggested in the field of optical range finding for accomplishing parts of this requirement. For example, it has been proposed to employ a pair of prisms, movable with respect to each other, to change one of a pair of light paths where a pair of images must be registered.

Such an arrangement although generally satisfactory for range finders, is not particularly suitable when dealing with separated component color images such as, for example, the component color images employed in color television. The effect of prisms to chromatically distort images is quite well known to the art. The cost and bulk of the prisms in such applications are often prohibitive.

According to the present invention a pair of transparent elements such as glass plates having parallel surfaces are positioned in the optical path between a point or image source and its projected image and by providing mechanical positioning devices so that the plates may be rotated about axes lying parallel to the plates and axes lying parallel to the object-image direction, it is possible, through the rotation of such plates, to displace the apparent or effective optical position of the projected image either laterally or longitudinally, separately, or both together without otherwise distorting, magnifying, or rotating the object or image planes. Not only can the obvious lateral displacements necessary to registration be achieved without complicated mechanical or electro-magnetic adjustments, but also by changing the effective object and/or image distance the magnification can be changed even though the image source position and the viewing screen are both fixed.

The effect of the rotation of the transparent elements is not very large so extremely fine vernier adjustments are possible with very crude mechanical arrangements.

A primary object of this invention is to provide an improved optical system for controlling each light path of a multiple optical system.

Another object of this invention is to provide for convenient registration of a plurality of images.

Another object of this invention is to secure the apparent displacement in face by simple means of the optical position of objects or images for the purpose of focussing, changing magnification or changing position of one or more points of light or images.

Other and incidental objects of the invention will be apparent to those skilled in the art from a reading of the following specification and an inspection of the accompanying drawing in which:

Figure 1 illustrates schematically the bending of a light ray when passing through two parallel surfaces of a transparent element having a refractive index differing from that of air;

Figure 2 illustrates the application of this invention in one of its simplest forms for the lateral displacement of one optical image with respect to another image for purposes of registration;

Figure 3 illustrates the application of this invention in one of its simplest forms for the longitudinal displacement of one optical image with respect to another image for purposes of registration; and, Figure 4 shows schematically this invention in another of its forms involving a color television system.

Turning now in more detail to Figure 1 there is shown an element 1 having parallel sides and having a refractive index greater than unity.

It will be seen that as light approaches along the path 3 it is bent upon entering the first face of element 1 and it is bent back to its original direction on leaving the element 1 at the opposite face and follows the path 5.

It will, of course, be seen that if the element 1 were not in the light path 3 or if the light path 3 intercepted the faces of element 1 perpendicularly, the light traveling along light path 3 would continue along the dotted line 7.

Turning to Figure 2 there is shown, by way of example, kinescopes 9 and 11 or other image forming devices together with their associated projecting lenses 13 and 15.

The light path from kinescope 11 is indicated by line 17 and as will be seen by inspection, is not interrupted until it arrives in the focussing plane 19.

In the light path 21 of kinescope 9 there is positioned, however, a pair of elements 23 and 25, each such as illustrated in Figure 1.

If it were not for the elements 23 and 25, the kinescope 9 in connection with its lens 13 might produce, because of other mechanical details of arrangement or imperfection, an image 27 which, as indicated, does not coincide with or correspond to the image 19 projected by lens 15 from kinescope 11. This failure to coincide may be manifest in that the two images are laterally displaced from one another in the same image plane, or in that the two image planes, the one of kinescope 11 and lens 15, and the other of kinescope 9 and lens 13, do not coincide but are displaced longitudinally backward or forward with respect to one another or combinations of both effects. It is only the first possibility which is intended to be illustrated in this Figure 2.

It is assumed in this explanation of Figure 2 that the sizes of the two images are already adjusted to be correct, either the same to secure complete registry, or in whatever proportion required in the use of the optical apparatus described. Since, as is well known, such adjustment can always be accomplished by the longitudinal motion of one of the lenses, or other means, this present assumption for the purposes of clarity of explanation does not constitute a limitation on the applicability of the present invention.

Now by properly rotating the elements 23 and 25 the light path 21 may be displaced to a position along line 29 in order that the image of the image forming kinescope 9 will be projected so as to coincide with the image 19 of the image forming kinescope 11. In this case of Figure 2, where only a lateral displacement of the one image is required, it is preferable that elements 23 and 25 be fixed at suitable inclinations to the optical axis 21 and be separately rotated about that axis so as to accomplish the desired adjustment.

In Figure 3 there is illustrated an arrangement for changing the length of the optical paths or changing the optical size of the image without the adjustment of the kinescopes 31 or 33. In Figure 3 the elements 35 and 37 are adjusted at an angle so that the optical path represented by line 39 corresponds in position to line 41. It will be noted, however, that the optical path 43 between elements 35 and 37 is displaced. In this manner the length of the optical path may be increased with respect to the overall paraxial distance between kinescope 31 and its image 45. By decreasing the mechanical paraxial distance between the object and its image, while holding the optical path length and hence also the magnification constant, the position of the image 45 will be made to coincide with the plane of the image 47 which may be the same plane as the image plane of the image forming kinescope 33.

It can be seen therefore in an inverse manner that the size of the images produced by kinescopes 31 and 33 may be independently changed by manipulation of the lenses 49 and 51. Yet by additional manipulation of the elements 35 and 37, the image planes may yet be made to coincide. It is true that in this manner magnification can be varied usually only a small amount, but it is often true that only a small amount of variation is required to obtain registry. The sharper these inclinations, and the greater the optical thickness of the elements 23 and 25, the greater will be the image displacement which can be effected by this adjustment. So long as the axial inclinations of the elements 23 and 25 are held fixed, no change in the paraxial path length from image forming kinescope 9 to image 27 will occur in the axial rotations of elements 23 and 25. Since, however, the initial insertion of elements 23 and 25 does change this path length, it is sometimes desirable to insert elements (not shown) similar to 23 and 25 and preferably at similar axial inclinations, but not necessarily rotatable about the optical axis, into the optical path 17 so as to effect an equal initial change of path length in path 17.

The circumstances described in Figures 2 and 3 are obviously special cases of non-coincidence of two optical images, which, after their relative sizes have been corrected, as by well known methods, may be still non-coincident by virtue of both lateral and longitudinal displacements simultaneously. It should now be clear that both of these displacements can be accounted for simultaneously by combination of the two types of adjustments described in connection with Figure 2 and Figure 3, respectively, both types of adjustments preferably operating on the same pair of compensating elements, each like 1 of Figure 1 and mounted so that both their angles of inclination to the optical axis and their azimuths of rotation about that axis may be adjusted independently.

Turning now in detail to Figure 4, there is illustrated a color television receiver 53. The color television receiver may take the form of any well known types such as, for example, that included in the description of a simultaneous type color television system in the article entitled "Simultaneous All Electron Color Television" beginning on page 459 of RCA Review for December 1946 or the article entitled "An Experimental Simultaneous Color System" beginning on page 861 of the Proceedings of the Institute of Radio Engineers for September 1947.

In the articles referred to immediately above, there is illustrated a simultaneous color television receiver including selected component color image forming kinescopes 55, 57, and 59, together with their projection lenses 61, 63, and 65, and their associated color filters 56, 58, and 60.

Although the theory upon which the color television of this sort operates is adequately described in the articles refrred to, the theory of operation will be briefly outlined in order to provide for a complete understanding of this invention.

As is well known to the optical art a color image may be reproduced by dividing the color from the object into several different selected component colors such as red, blue, and green. In accordance with normal television procedure each of the several different component colors may be transformed into electrical information and transmitted to a remote location. The electrical information may then be re-converted into an optical image representative of the respective selected component color. The several component color images may then be combined in registry to form a material color image.

As was indicated above, it is, of course, necessary to obtain accurate registry when combining the several images to form a composite image.

In the illustration of Figure 4 the several different possibilities of change are illustrated.

For example, the light, the red colored image from the kinescope 55, and filter 56 is transmitted through the elements 67 and 69 which are positioned with respect to each other to change the path length in order to correct for error in image size.

The green image from kinescope 57 and filter 58, however, is transmitted along its optical path without change by positioning the elements 71 and 73 in a parallel position and in a position such that the light intercepts it at substantially a right angle.

The blue light image from kinescope 59 and filter 60, however, is displaced by the proper positioning of elements 75 and 77 as explained in Figure 2 above. Such correction permits light from the corresponding point on each of the kinescopes 55, 57, and 59 to register at point 79.

Having thus described the invention what is claimed is:

1. An optical system for registering two points of light at an imaging point comprising a pair of point of light sources, a plurality of clear elements each having refractive indices differing from the refractive index of air and each transparent element having two parallel surfaces through which the same and substantially all the light will pass from only one of said light sources, and means for tilting each of said transparent elements, with respect to each other and with respect to said last referenced light source to independently change the effective optical distance between the light source last referred to and said imaging point and to change the position of the imaging point of said last referenced light source.

2. An optical system for registering two points of light at an imaging point comprising a pair of point of light sources, a lens system positioned to focus said points of light substantially in registry at said imaging point, a plurality of transparent elements each transmitting the entire visual spectrum substantially uniformly and each having refractive indices differing from the refractive index of air and each transparent element having two parallel surfaces through which the same light and substantially all the light will pass from only one of said light sources, and means for tilting said transparent elements with respect to each other and with respect to said last referenced light source to change the focal distance of said optical system and to change the position of the imaging point of said last referenced light source.

3. An optical system comprising a pair of light point sources, a lens system positioned to focus said points of light substantially in registry at said imaging point, a pair of neutral transparent elements each having refractive indices differing from the refractive index of air and each transparent element having two parallel surfaces, both of said transparent elements positioned in a direct line between one of said light point sources and said imaging point and means for tilting each of said elements with respect to the optical path between said light sources and said imaging point and with respect to said last referenced light source to independently change the effective length of said optical path and to change the position of the imaging point of said last referenced light source.

4. An optical system for registering two points of light at an imaging point comprising a pair of light point sources, a lens system positioned to focus said points of light substantially in registry at said imaging point, a pair of transparent elements each having refractive indices differing from the refractive index of air and each transparent element having two parallel surfaces, said transparent elements positioned in a single light path and between one of said light point sources and said imaging point, and means for rotating each of said transparent elements about a line in their plane and with respect to said last referenced light source to independently change the relative optical path length of the paths of light with respect to each other and to change the position of the imaging point of said last referenced light source.

5. An arrangement for registering images in an imaging plane comprising a pair of light image sources, an optical system positioned to focus said images substantially in registry in said imaging plane, a pair of clear, light transmitting elements each having refractive indices differing from unity and each transparent element having two parallel light transmitting surfaces, said transparent elements positioned in one light path and between one of said light image sources and said imaging plane and wherein each of said transparent elements are rotatable about a line in their plane and wherein said lines are parallel to change the relative effective optical path length and the relative position of the images in said image plane independently of each other.

6. An arrangement for registering images in an imaging plane comprising a pair of light image sources, an optical system positioned to focus said images substantially in registry in said given plane, a pair of transparent elements each having equal refractive indices differing from unity and each transparent element having two parallel surfaces, said transparent elements positioned in line and between one of said light image sources and said imaging plane, and means for rotating the plane of each of said transparent elements to change the effective optical path length between said light image sources and said image plane and to change the relative positions of said images on said imaging plane independently of the change in effective optical path length.

7. An optical system comprising in combination a plurality of light image sources, an imaging screen, a lens system in cooperative positioning with said light image sources to project the light images of said sources on said imaging screen in substantial registry, a separate pair of transparent elements positioned in at least all but one light path between said light image sources and said imaging screen, said transparent elements each having two parallel surfaces through which the light is directed and wherein the refractive indices of said transparent elements differ from unity, means for rotating said elements about parallel lines to control the relative effective optical path length of said light paths and the relative position of the light images on said imaging screen.

8. A color television image reproducing system having an arrangement for registering a plurality of different component color images comprising in combination, sources of said different component color images, a lens system positioned to focus said different component color images substantially in registry in a given plane, a plurality of clear elements each having refractive indices differing from unity and each transparent element having two parallel surfaces, a different pair of said clear elements positioned in the same light path between each of said images and said imaging plane, and means for changing the effective focal length of the lens in said light path referred to immediately above and independently of said previous change, changing the relative position of said images by rotating planes of each of said transparent elements with respect to each other and with respect to said light paths.

WILLIAM H. CHERRY.

References Cited in the file of this patent

UNITED STATES PATENTS

| Number | Name | Date |
|---|---|---|
| 432,530 | Ives | July 22, 1890 |
| 1,151,787 | Holbrook | Aug. 31, 1915 |
| 1,208,490 | Comstock | Dec. 12, 1916 |
| 1,541,315 | Ball et al. | June 9, 1925 |
| 1,599,719 | Reach | Sept. 14, 1926 |
| 1,661,757 | Jones | Mar. 6, 1928 |
| 1,869,275 | Planer | July 26, 1932 |
| 1,870,664 | Wright | Aug. 9, 1932 |
| 2,027,369 | Bourges | Jan. 14, 1936 |
| 2,064,145 | Bonneau | Dec. 15, 1936 |
| 2,184,831 | Campbell | Dec. 26, 1939 |
| 2,233,441 | Whittaker | Mar. 4, 1941 |
| 2,307,981 | Babcock et al. | Jan. 12, 1943 |
| 2,352,214 | Ligh | June 27, 1944 |
| 2,366,267 | Kienninger | Jan. 2, 1945 |
| 2,384,319 | Lebus | Sept. 4, 1945 |
| 2,405,063 | Sisson | July 30, 1946 |
| 2,429,849 | Somers | Oct. 28, 1947 |
| 2,449,542 | Ayers et al. | Sept. 21, 1948 |

FOREIGN PATENTS

| Number | Country | Date |
|---|---|---|
| 25,908 | Great Britain | of 1906 |